United States Patent [19]
Apel

[11] 3,785,603
[45] Jan. 15, 1974

[54] ADJUSTABLE MOUNT

[75] Inventor: Ernst Apel, Gebrunn-Wurzburg, Germany

[73] Assignee: Ernst Apel Fabrik fur Feinnechanik, Gerbrunn-Wurzberg, Germany

[22] Filed: Oct. 18, 1971

[21] Appl. No.: 189,852

[30] Foreign Application Priority Data
Oct. 20, 1970 Germany.................. P 70 38 599.8

[52] U.S. Cl................................. 248/225, 33/247
[51] Int. Cl............................................. F41g 1/38
[58] Field of Search........................... 248/229, 225; 33/245, 247, 248, 249; 285/308, 317

[56] References Cited
UNITED STATES PATENTS

| | | | |
|---|---|---|---|
| 3,276,127 | 10/1966 | Abrahamson | 33/247 |
| 2,320,397 | 6/1943 | Ross | 285/317 |
| 1,408,993 | 3/1922 | Eberhardt | 287/53 |
| 2,482,856 | 9/1949 | Lloyd | 248/225 |
| 3,491,820 | 1/1970 | Ostling | 248/225 |

*Primary Examiner*—Ramon S. Britts
*Assistant Examiner*—Rodney H. Bonck
*Attorney*—Michael S. Striker

[57] ABSTRACT

An adjustable mount for releasably mounting a first component on a second component, particularly for telescopic sight assemblies, includes a first element which is adapted to be mounted on the second component. The first element has a surface which is provided with an undercut securing groove having at least one open end. A second element is adapted to be fixed to the first component and has a securing stud which is shaped to mate with the securing groove to thereby provide a slidable fit therethrough. The securing stud is receivable in the securing groove through the open end thereof. A substantially circular member has a cutout portion which defines a flat surface, the circular member being mounted on the first element for rotation in the region of the open end, the circular member being rotatable between a first position in which the surface is so positioned in relation to the securing groove that the securing stud can pass into or out of the groove and a second position in which the surface is so oriented that the securing stud can only enter but not move out of the groove. A bolt having an eccentric portion is rotatable on the first element and moves relative to the securing stud in response to rotation of the bolt, the bolt being operatively positioned in relation to the stud to force the stud against surfaces of both the groove and the circular member to effectively lock the second element to the first element.

4 Claims, 6 Drawing Figures

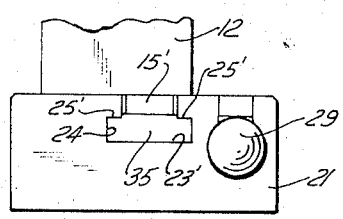
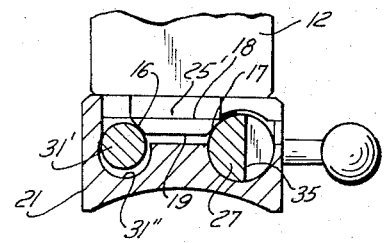
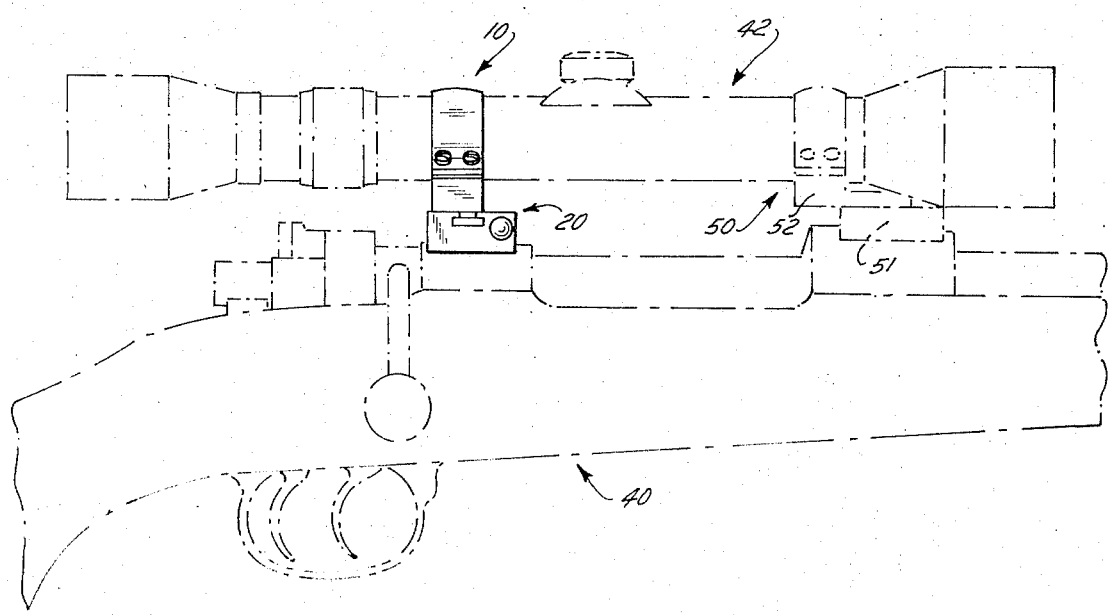

ADJUSTABLE MOUNT

BACKGROUND OF THE INVENTION

The present invention relates generally to support mounts and more particularly to an adjustable mount for telescopic sight.

Mounts for telescopic sights exist in which the locking mechanism consists of slide latches. These slide latches are pushed together either by hand or by means of springs. These mounts exhibit a disadvantage in that any adjustment is extremely difficult and can only be achieved by permanently distorting the parts of the mount. Alternately, adjustments can be made by costly expansion of effort and time.

SUMMARY OF THE INVENTION

An object of the present invention is to provide an adjustable mount for releasingly mounting a first component on a second component, particularly for telescopic sight assemblies, which does not have the disadvantages of the prior art mounts.

Another object of the present invention is to provide an adjustable mount which is simple in construction and inexpensive to manufacture and which is effective in securing a first component to a second component.

A further object of the present invention is to provide an adjustable mount which can be easily adjusted to compensate for manufacturing tolerances.

A still further object of the present invention is to provide an adjustable mount which is designed to have portions dimensioned to facilitate the engagement of connecting members and providing adjusting means for rigidly securing the members after engagement.

Another object of the present invention is to provide an adjustable mount which provides an adjusting means for locking two engaging members and further provides securing means for maintaining the effectiveness of the adjusting means.

A further object of the present invention is to provide an adjustable mount which includes spring biased latching means which enables the engagement of two mating members as a result of the urging of one member against the other, but which requires manual operation for the disengagement of the members.

According to the present invention, an adjustable mount for releasingly mounting a first component on a second component, particularly for telescopic sight assemblies, is provided. Said mount comprises a first element adapted to be mounted on said second component, said first element having a surface provided with an undercut securing groove having at least one open end. A second element is adapted to be fixed to said first component and has a securing stud which is shaped to mate with said securing groove to thereby provide a slidable fit therebetween. Said securing stud is receivable in said securing groove through said open end thereof. Latching means are mounted on said first element in the region of said open end for movement between first and second positions, said latching means being operative in said first position for permitting insertion of said securing stud into said securing groove through said open end and for thereupon moving to said second position. Said latching means is operative in said second position for preventing the disengagement of said first and second elements.

According to a presently preferred embodiment, said groove has an undercut surface and said stud has a top surface shaped to mate with said undercut surface. The mount further comprises locking means for urging said two surfaces into intimate contact to thereby limit the movement of said stud in relation to said groove.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a fragmentary end elevation of the adjustable mount shown in engaged position;

FIG. 5 is a fragmentary front elevational view, partly in section, of the engaged members as shown in FIG. 4; and FIG. 6 is an end elevational view of the present invention, showing, in outline, how it is used to mount a telescopic sight on a rifle.

DESCRIPTION OF THE PREFERRED EMBODIMENTS

Figure 1:
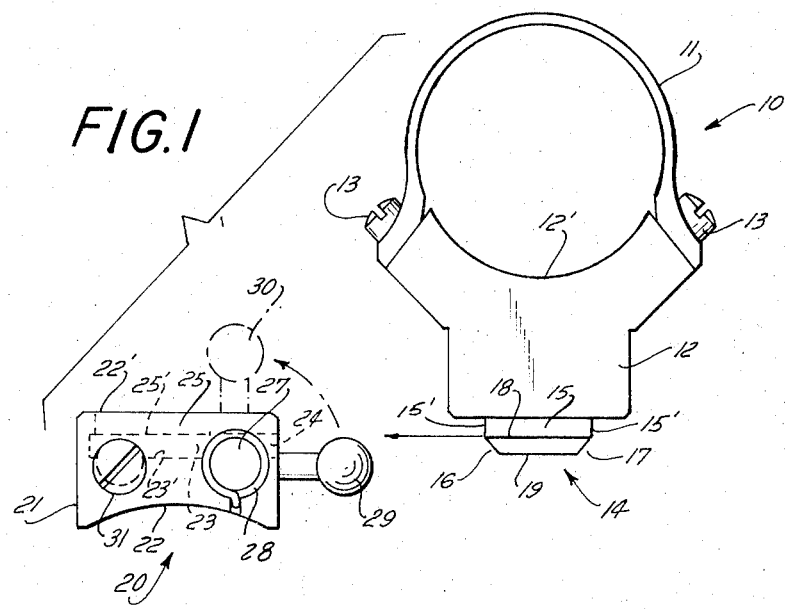
FIG. 1 is an exploded front elevational view of an adjustable mount according to the present invention.

Referring to the drawings, in which like reference numerals are used to designate like parts throughout, and looking first at FIG. 1, an adjustable mount according to the present invention is shown to consist of mounting elements or members 10 and 20. Mounting member 10 comprises ring 11 and body 12. Screws 13 hold ring 11 to body 12 and are used to adjust the tightness with which mounting member 10 holds a member to be mounted within the ring portion. Body 12 has a circular surface 12', which together with the ring 11 forms a circular holding member for holding a component to be mounted, such as a telescopic sight. The particular shape of the body 12, except as to be described hereafter, as well as the shape of ring 11 is not critical to the present invention. Instead of a circular shape, any other shape can be used to hold or mount other than circular objects. Also, instead of fastening screws 13, other fastening means can be utilized with the present invention without departing from the spirit thereof.

The lower portion of the body portion 12 is provided with a securing stud 14 which has a neck 15 with end portions 15'. Bevelled lower surfaces 16 and 17 and bottom surfaces 19 define the shape of securing stud 14 as shown in FIG. 1. A widening of the neck 15 at the upper ends of the bevelled lower surfaces 16 and 17 results in a top surface 18. The neck 15 as well as the top surface 18 can be better seen in FIG. 2. In the latter Figure, the neck 15 is shown to be enlarged on both sides, top surfaces 18 being formed as shown.

Another element or mounting member 20 is provided which comprises a housing 21 which is secured to the component on which something is to be mounted. For the purposes of the following discussion, the present invention will be described in relation to the mounting of a telescopic sight on a gun or rifle. Accordingly, housing 21 is provided with a shaped surface 22 to correspond with the barrel of the rifle. The housing 21 is also provided with a top surface 22'. A groove 23 has an open end 24 which opens through surface 22'. The opening of groove 23 through the surface 22' creates an undercut securing groove flanged portion 25 having an undercut surface 25'.

Mounted in the housing 21 is a latching means 27 which is spring-biased by spring 28. Connected to the latching means 27 is a handle 29. The handle 29 is movable between a first position, shown in dashed outline, and a second position as shown in FIG. 1. As will be described hereafter, the function of the latching means 27 is to regulate the open end 24 to the groove 23 and thereby to regulate the movements of the securing stud 14 into or out of the groove.

Also mounted on the housing 21 is a locking means 31, shown here as a bolt. The function of the bolt 31 to urge the securing stud 14 into a locked position and thereby fix its movement in relation to the housing 21, as will hereinafter be described.

Figure 2:
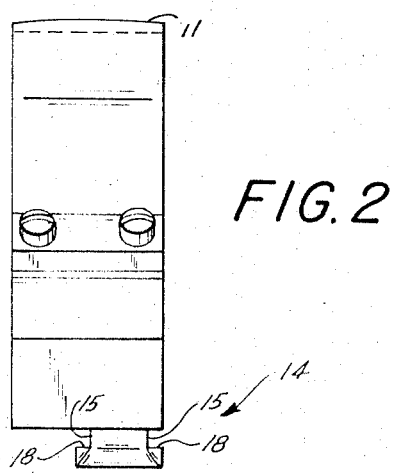
FIG. 2 is an end elevation of one of the mounting members shown in FIG. 1.

As described above, mounting member 10 is provided with a securing stud 14 as defined in FIGS. 1 and 2. By utilizing a shape for securing stud 14 as shown, or a modification thereof within the spirit of the present invention, simple engagement and locking of the two mounting members one to the other becomes possible as will now be described.

Figure 3:
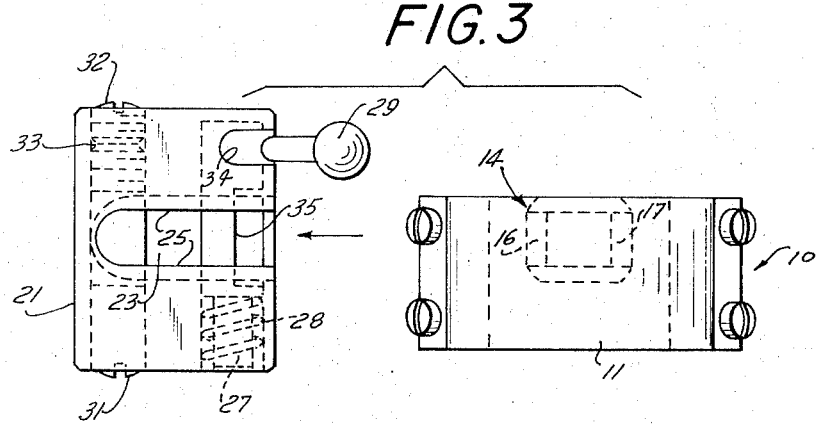
FIG. 3 is an exploded top plan view of the adjustable mount shown in FIG. 1.

FIG. 3 illustrates a top plan view of the mount shown in FIG. 1, in both of these Figures the mounting member 10 is shown in a position just prior to engagement with mounting member 20. Here latching means 27 is shown to include a cut-out portion 35 which defines a flat surface in the region of the groove open end 24. The latching means or bolt 27 is preferably mounted so that its axis of rotation lies in the plane of surface 23' of the groove 23. Also, according to the presently preferred embodiment, the surface 35 passes through the axis of rotation. With this arrangement, when the bolt 27 is rotated 90°, as generally represented by the position of the handle in dashed outline in FIG. 1, the surface 35 is coplanar with the surface 23'. The spring 28 urges the bolt 30 to take on the position shown by the solid handle in FIG. 1. In this position of the bolt 27, the surface 35 will generally be perpendicular to the surface 23'. In the position shown, the bolt 27 blocks the open end 24 of groove 23. The opening 24 can be freed in two ways. First, handle 29 can be moved manually from the position shown to position 30, shown in outline in FIG. 1. When this is done, handle 29 being connected to bolt 27, said bolt will likewise rotate 90° to bring surface 35 into the plane of the surface 23'. Alternately, the securing stud 14 can be partially inserted into open end 24. By forcing the mounting member 10 against mounting member 20 in a direction as shown by the arrow S in FIGS. 1 and 3, the securing stud 14 will transmit the applied forces to the upper portion of the surface 35 of the bolt 27. The resulting torque on the bolt 27 will be effective to rotate the bolt. If the resulting torque is greater than that applied on the bolt 27 by the spring 28, the bolt 27 will continue to rotate until the surfaces 35 and 23' are in the same plane. The housing 21 is provided with a slot 34 which limits the rotation of the bolt 27 by limiting the movement of the handle 29 between the two positions shown in FIG. 1. For this reason, the application of corresponding forces on the bolt 27 from within the groove as opposed to the region outside the groove at open end 24, will not result in corresponding opening of the groove by rotation of the bolt 27. Stated another way, when the groove 23 is blocked by the bolt 27, the bolt 27 can rotate from the position shown in FIG. 1, to position 30 but it cannot move in the other direction. Once the securing stud 14 is engaged within the groove 23, it is only possible to disengage the two mounting members by manually unblocking the open end 24 by moving the handle 29 to position 30.

Also shown in FIG. 3, are some of the details of the bolt 31, which is shown threaded and extending beyond the region of the groove 23. The bolt 30 has a surface at the end of the threaded portion which mates with a corresponding surface of safety means 32, here shown as a coaxial screw. As will be further described hereafter, once bolt 31 has been rotated into locking position of the mounting members, coaxial screw 32 can be advanced into the housing 21 until the end surfaces of the bolt 31 and coaxial screw 32 come into abutting engagement as shown at 33. By tightening coaxial screw 32, frictional forces are applied to the bolt 31, said frictional forces being effective to prevent the undesired rotation of the bolt 31, which rotation may prevent effective locking of the two mounting members 10 and 20.

FIG. 4 more clearly illustrates several of the components and surfaces discussed in relation to the first three Figures. Here, securing stud 14 has been fully engaged within the groove 23. As such, the biasing spring 28 has returned the bolt 27 and the handle 29 to its normal position. In this position of the bolt 27, the surface 35 is clearly visible, said surface blocking open end 24 as described above. In this Figure, the surfaces 35 and 23' are in substantially perpendicular relation to one another. When bolt 27, and therefore handle 29, is moved to position 30 shown in FIG. 1, surface 35 rotates 90° to become coplanar with surface 23' and therefore effectively completely opens groove 23 for the movement in or out of the securing stud 14. Also shown in FIG. 4, are the undercut surfaces 25', these surfaces being effective for rigidly locking the securing stud 14 as will hereinafter be described.

Aside from showing the details of the bolt 27, FIG. 5 shows how locking of the body 12 is affected. Here, the bolt 27 has already been rotated to position 30 to permit the entrance of the securing stud 14 into the groove 23. Once entry has been accomplished, the biasing means 28 returns the bolt 27 to its normal position as shown in FIG. 5. To lock the body 12 and to prevent its relative movement in relation to the housing 21, bolt 31 is rotated. Bolt 31 has a narrowed diameter eccentric portion 31' across the width of the groove 23 as shown in FIG. 5. Rotation of bolt 31 causes the eccentric portion 31' to move along the circumference of surface 31'', effectively changing the distance between the eccentric portion 31' and the bolt 27 and the surfaces 25'. Locking is effected by rotating bolt 31 so that the distances between the eccentric portion 31' and the bolt 27 and the surfaces 25' are minimized. When these distances are decreased, the lower surfaces 16 and 17 of the securing stud 14, forming bevelled portions, are urged in an upward direction towards the undercut surfaces 25'. Since the top surfaces 18 of securing stud 14 are urged up simultaneously, top surfaces 18 come into abutting engagement with undercut surfaces 25'. Bolt 31 is rotated until the securing stud 14 is rigidly locked between undercut surfaces 25', eccentric portion 31' and bolt 27 at surfaces 18, 16 and 17, respectively. To disengage the mounting member 10 from the mounting member 20, the bolt 31 is rotated so as to increase the distances between the eccentric portion 31' and the bolt 27 and surfaces 25'. These increased distances permits the securing stud to drop until the securing stud, at bottom surface 19 makes contact with the surface 23' of groove 23. The removal of pressure applied by eccentric portion 31' on lower surface 16 correspondingly removes the pressure applied on bolt 27 by lower surface 17, this permitting the manual rotation of the bolt 27 into position 30 against the action of spring 28. Disengagement of securing stud 14 from groove 23 is not possible as described above.

FIG. 6 shows a typical application of the present invention in connection with the mounting of a telescopic sight 42 on a rifle 40. A first mounting member 50 comprising a pivoting portion 52 and a fixed portion 51 does not form part of the present invention. With the type of mounting member 50 shown, the front end of the telescopic sight 42 is pivotally mounted in fixed portion 51. The rear end of the telescopic sight 42 is provided with a mounting member 10 as described above. A mounting member 20 as described above is mounted on the rifle 40. The rear end of the telescopic sight 42 is pivoted about a pivot point defined by mounting member 50 until mounting members 10 and 20 are proximally in relationship to one another as shown in FIGS. 1 and 3. The latching engagement and the locking is then achieved as described in connection with those two Figures. The application in FIG. 6 is merely illustrative and is not intended to limit the many applications in which one component can be conveniently mounted on another component. In connection with FIG. 6 it is possible that mounting member 50 be replaced by corresponding members 10 and 20. Also, although groove 23 has been shown to be generally of rectangular shape, other shapes are fully intended to be within the scope of the present invention, it only being required that some equivalent of undercut surface 25' be provided against which top surfaces 18 can be rigidly brought to bear upon. It is understood that the shape of securing stud 14 may have to be correspondingly modified to mate with a different shaped groove.

It will be understood that each of the elements described above, or two or more together, may also find a useful application in other types of mounts differing from the types described above.

While the invention has been illustrated and described as embodied in an adjustable mount for telescopic sight assemblies, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. An adjustable mount for releasingly mounting a first component on a second component, particularly for telescopic sight assemblies, said mount comprising a first element adapted to be mounted on said second component, said first element having a surface provided with an undercut securing groove, the latter having an undercut surface and at least one open end; a second element adapted to be fixed to said first component and having a securing stud which is adapted to mate with said securing groove to thereby provide a slidable fit therebetween, said securing stud being receivable in said securing groove through said open end thereof and having a top surface shaped to mate with said undercut surface; latching means on said first element in the region of said open end for movement between first and second positions, said latching means being operative in said first position for permitting insertion of said securing stud into said securing groove through said open end and for thereupon moving to said second position, said latching means being operative in said second position for preventing the disengagement of said first and second elements; and locking means comprising a bolt having at least one eccentric portion, said eccentric portion moving relative to said undercut surface with rotation of said bolt, said bolt being operatively positioned in relation to said stud to thereby move said top surface of said stud in relation to said undercut surface in response to rotation of said bolt.

2. An adjustable mount as defined in claim 1, wherein said stud includes first and second lower surfaces, said first lower surface facing said locking means, said second lower surface facing said latching means, said locking means being operative for urging said stud top surface towards said undercut surface and towards said latching means in response to rotation of said bolt, said second lower surface simultaneously being urged against said latching means in said second portion, whereby said stud is rigidly secured by the intimate contacts resulting at said top surface and said first and second lower surfaces of said stud.

3. An adjustable mount as defined in claim 2, further comprising safety means for maintaining said limited movement of said stud by holding said locking means in urging position.

4. An adjustable mount as defined in claim 3, wherein said safety means comprises a screw coaxial with said bolt and mounted for movement towards said bolt for bearing contact thereon, whereby said screw applies frictional forces upon said bolt in response to advancing said screw to come in contact with said bolt and thereby preventing said bolt from rotating from its locked position.

* * * * *